Figure 1:
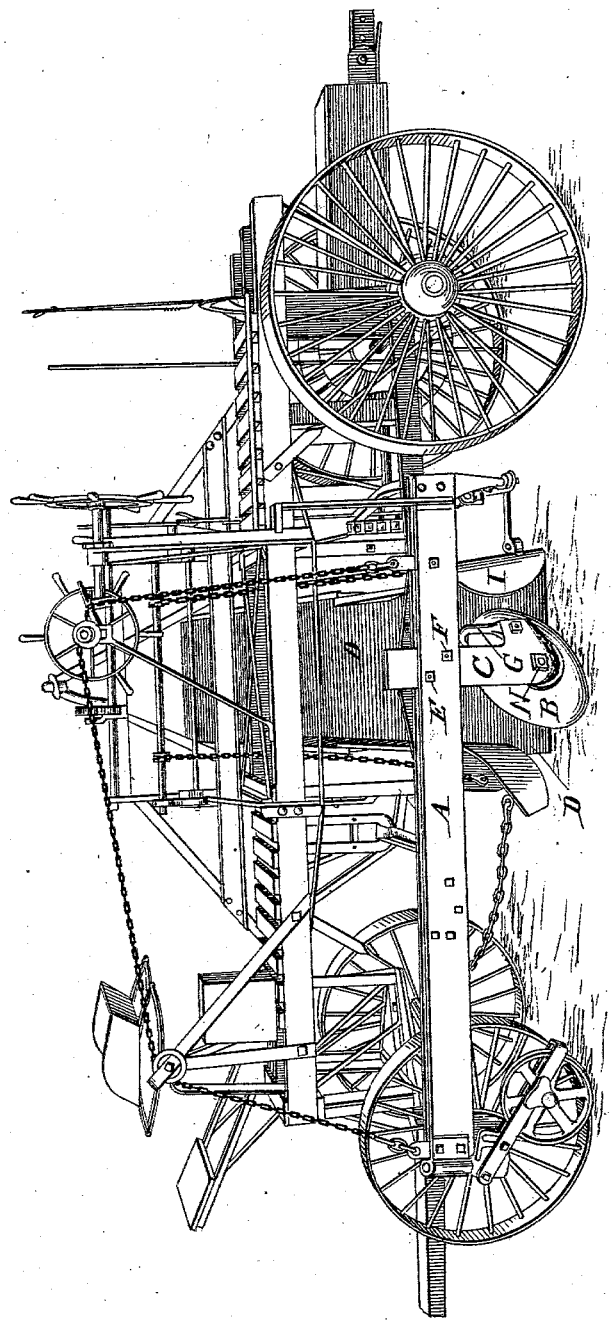

No. 758,148. PATENTED APR. 26, 1904.
A. L. POWLISON & E. C. ERB.
ROAD GRADING MACHINE.
APPLICATION FILED DEC. 18, 1903.
NO MODEL. 2 SHEETS—SHEET 2.

No. 758,148. Patented April 26, 1904.

UNITED STATES PATENT OFFICE.

ALLEN L. POWLISON, OF ERIE, AND ELIAS C. ERB, OF HUNTER, NORTH DAKOTA, ASSIGNORS OF ONE-THIRD TO DAVID H. HOUSTON, OF HUNTER, NORTH DAKOTA.

ROAD-GRADING MACHINE.

SPECIFICATION forming part of Letters Patent No. 758,148, dated April 26, 1904.

Application filed December 18, 1903. Serial No. 185,764. (No model.)

*To all whom it may concern:*

Be it known that we, ALLEN L. POWLISON, residing at Erie, and ELIAS C. ERB, residing at Hunter, in the county of Cass and State of North Dakota, citizens of the United States, have invented new and useful Improvements in Road-Grading Machines, of which the following is a specification.

Our invention relates to grading-machines, and has for its object the provision of an improved grading-machine capable of doing work better and more expeditiously than the grading-machines heretofore made and used prior to our invention.

Our invention consists of the combination, with a grading-machine, of a rotary disk plow adapted and positioned to deliver dirt upon the dirt-carrier of a grading-machine.

In the drawings forming part of this specification similar characters of reference denote the similar parts in all of the illustrations.

Figure 2:
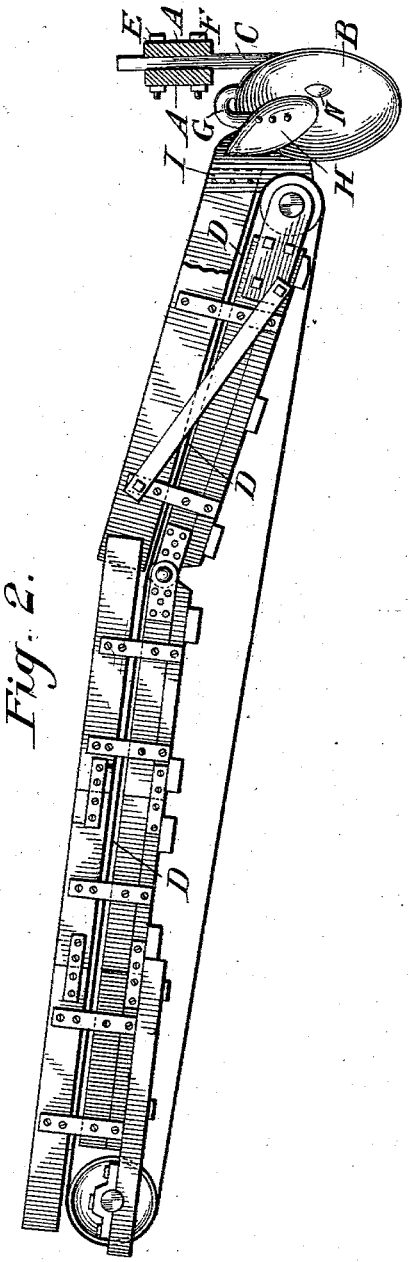

Figure 1 represents a perspective view of our grading-machine. Fig. 2 represents a cross-section through the adjustable frame A and showing the dirt-carrier in side elevation and the rotary disk in front elevation.

In carrying out our invention a suitable concave rotary disk plow B may be axled at N upon a standard C, which standard may be secured to the adjustable beam A and the rotary disk plow positioned to deliver dirt upon the dirt-carrier D of the grading-machine.

In our grading-machine, A represents the beam for carrying the rotary disk plow.

B represents the rotary disk plow.

C represents the standard for carrying the rotary disk plow.

D represents the adjustable endless-apron dirt-carrier, having its lower end adjustable to raise and lower.

E and F are bolts passed through the beam and the plow standard, and the said bolts hold the standard secure to the beam.

G represents a small standard that is secured to the large standard C, and the said small standard passes over the top of the rotary disk plow, which small standard is bent down at G, as shown in Fig. 2, and the said small standard supports a small moldboard adjusted to scrape the rotary disk plow and also assist in turning the dirt over upon the endless dirt-carrier D.

I represents the incurved end of the rear side board upon the dirt-carrier frame.

Having described our invention, we claim—

1. In a grading-machine the combination of a rotary disk plow and a dirt-carrier.

2. In a grading-machine the combination of a plow-beam movably arranged to raise and lower, said beam carrying a rotary disk plow, and of an endless-apron dirt-carrier having its lower end adjustable to raise and lower.

3. In a grading-machine the combination of an endless-apron dirt-carrier having its lower end adjustably arranged to raise and lower, and a rotary disk plow adjustably arranged to raise and lower, said disk plow placed in a position where the said plow can deliver dirt upon the said carrier.

In testimony whereof we have signed our names to this specification in the presence of two subscribing witnesses.

ALLEN L. POWLISON.
ELIAS C. ERB.

Witnesses:
J. H. GALE,
D. McKENZIE.